(12) United States Patent
Kure et al.

(10) Patent No.: US 8,322,135 B2
(45) Date of Patent: Dec. 4, 2012

(54) HYDRAULIC DEVICE AND WORK MACHINE

(75) Inventors: Kazuki Kure, Ibaraki (JP); Kazuyuki Suzuki, Hirakata (JP); Shigeru Yamamoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 734 days.

(21) Appl. No.: 12/594,211

(22) PCT Filed: Jun. 24, 2008

(86) PCT No.: PCT/JP2008/061458
§ 371 (c)(1),
(2), (4) Date: Oct. 1, 2009

(87) PCT Pub. No.: WO2009/001820
PCT Pub. Date: Dec. 31, 2008

(65) Prior Publication Data
US 2010/0071359 A1 Mar. 25, 2010

(30) Foreign Application Priority Data
Jun. 25, 2007 (JP) ................................. 2007-166816

(51) Int. Cl.
*F15B 13/06* (2006.01)
(52) U.S. Cl. .......................................... 60/428; 60/422
(58) Field of Classification Search .................. 60/420, 60/422, 459, 468, 428, 429; 91/516
See application file for complete search history.

(56) References Cited

U.S. PATENT DOCUMENTS

| 3,987,874 | A | | 10/1976 | Fuehrer et al. |
| 4,262,335 | A | | 4/1981 | Ahlen et al. |
| 4,321,793 | A | | 3/1982 | Uranaka et al. |
| 4,453,451 | A | * | 6/1984 | Streeter et al. .................... 91/28 |
| 5,471,908 | A | * | 12/1995 | Lech ............................... 91/516 |
| 6,350,108 | B1 | | 2/2002 | Haupt |
| 6,361,287 | B1 | | 3/2002 | Hopper |

FOREIGN PATENT DOCUMENTS

| JP | 56-005224 A | | 1/1981 |
| JP | 2000-046165 A | | 2/2000 |
| JP | 2006038236 A | * | 2/2006 |
| WO | WO-2007/074633 A1 | | 7/2007 |

OTHER PUBLICATIONS

European Search Reponrt dated on Jul. 20, 2010 of the corresponding European Application No. 08 765 802.7.

* cited by examiner

*Primary Examiner* — Thomas E Lazo
*Assistant Examiner* — Logan Kraft
(74) *Attorney, Agent, or Firm* — Global IP Counselors

(57) ABSTRACT

A hydraulic device has a first pump, a second pump, an operating state detector configured and arranged to detect an operating state, a connection switching unit configured and arranged to selectively connect the second pump to either a first hydraulic oil line or a second hydraulic oil line, and a switching controller configured to control, based on the operating state detected by the operating state detector, a switching operation of the connection switching unit. The switching controller is further configured to inhibit the switching operation of the connection of the second pump when the detected operating state is such that at least one of clutches of a multi-stage transmission and a steering device is in a state transition or at least one brake of the steering device is being operated.

5 Claims, 9 Drawing Sheets

HYDRAULIC DEVICE AND WORK MACHINE

CROSS-REFERENCE TO RELATED APPLICATIONS

This national phase application claims priority to Japanese Patent Application No. 2007-166816, filed on Jun. 25, 2007. The entire disclosure of Japanese Patent Application No. 2007-166816 is hereby incorporated herein by reference.

TECHNICAL FIELD

The present invention relates to a hydraulic device and a work machine comprising the hydraulic device.

BACKGROUND ART

There are hydraulic devices in which hydraulic oil is supplied from a single large-displacement pump to a torque converter, a steering device, and a multi-stage transmission for performing gear-shifting by selectively engaging and releasing a plurality of hydraulic clutches. An example of the hydraulic device according to the related art is shown in FIG. 10. In the hydraulic device, low-pressure high-flow hydraulic oil is needed in order to operate a torque converter 200, and high-pressure low-flow hydraulic oil is needed in order to operate a multi-stage transmission 100 and a steering device 300. In view of this, in this hydraulic device, a single large-displacement pump 500 outputs high-pressure high-flow hydraulic oil to a hydraulic oil line P10. At this time, the multi-stage transmission 100 and the steering device 300 are supplied with only a low flow rate of hydraulic oil at a high pressure. The torque converter 200 is supplied with a high flow rate of hydraulic oil that has undergone pressure relief through a pressure regulator 310 and whose pressure has been lowered. In other words, since an extremely small amount of oil is needed to operate the multi-stage transmission 100 and the steering device 300, a large portion of the hydraulic oil supplied from the pump 500 is supplied to the torque converter 200.

There are also hydraulic devices equipped with a pump designated for operating the multi-stage transmission, a pump designated for operating the torque converter, and a pump designated for operating the steering device (for example, see Japanese Laid-open Patent Application Publication No. 56-5224).

SUMMARY OF THE INVENTION

In cases in which a multi-stage transmission, a torque converter, and a steering device are all operated by a single large-displacement pump, low pressure is sufficient in order to operate the torque converter, but high pressure is needed in order to operate the multi-stage transmission and the steering device. Therefore, the large-displacement pump must be capable of discharging high-pressure hydraulic oil. However, in order to operate the torque converter in this case, the pressure is increased unnecessarily, and loss occurs.

A gear pump or another fixed-displacement pump is often used as the pump for discharging hydraulic oil for the sake of cost limitations. The amount of oil discharged by a fixed-displacement pump varies depending on the rotational speed of the engine driving the pump.

Therefore, in order to always operate the clutches of the multi-stage transmission with good responsiveness in the case of a hydraulic device equipped with a plurality of designated pumps, pump size and other factors must be determined so that a sufficient amount of discharged oil can be ensured even when the amount of oil discharged from the pumps is small. Therefore, when the engine rotates at a high speed, hydraulic oil is supplied at a higher flow rate than necessary as a result, and loss occurs in this case as well.

In view of this, the inventors of the present invention have proposed a hydraulic device comprising a plurality of pumps, wherein the connections of the pumps are switched according to an operating state. This hydraulic device comprises a first pump, a second pump, a connection switching unit, and a switching controller. The first pump supplies hydraulic oil to a multi-stage transmission and a steering device via a first hydraulic oil line. The second pump either supplies hydraulic oil to the multi-stage transmission and the steering device via the first hydraulic oil line, or supplies hydraulic oil to a torque converter via a second hydraulic oil line. The connection switching unit connects the second pump to either the first hydraulic oil line or the second hydraulic oil line. The switching controller performs switching control in accordance with the hydraulic oil temperature, the engine rotational speed, or another operating state. Switching control is control for switching the connection of the second pump to the first hydraulic oil line or the second hydraulic oil line by controlling the connection switching unit.

In this hydraulic device, when the second pump is connected to the first hydraulic oil line, hydraulic oil is supplied to the multi-stage transmission and the steering device from both the first pump and the second pump. When the second pump is connected to the second hydraulic oil line, hydraulic oil is supplied from the first pump to the multi-stage transmission and the steering device, and hydraulic oil is supplied from the second pump to the torque converter.

Consequently, the necessary oil amount and oil pressure can be provided by additionally supplying hydraulic oil from the second pump, even in cases in which the hydraulic oil supplied to the multi-stage transmission and the steering device is insufficient with only the hydraulic oil from the first pump.

In cases in which speed level switching is performed in the multi-stage transmission, oil pressure control is performed in order to prevent the occurrence of gear-shifting shock. During oil pressure control, the oil pressure is controlled so that the clutch pressure changes with a predetermined waveform from the start of speed level switching until the switching is completed. Oil pressure control is similarly performed so that the supplied oil pressure changes with a predetermined waveform when the brakes of the steering device are switched from a braking state to a non-braking state and also from a non-braking state to a braking state.

However, in a hydraulic device such as the one described above, in the instant the connection of the second pump is switched, the oil pressure supplied to the multi-stage transmission and the steering device may fluctuate. Therefore, it is difficult to appropriately implement oil pressure control when the connection of the second pump is switched while oil pressure control is being implemented.

An object of the present invention is to provide a hydraulic device and a work machine in which oil pressure control can be appropriately performed during the switching of a multi-stage transmission and a steering device.

A hydraulic device according to a first aspect of the present invention is a hydraulic device for supplying hydraulic oil to a torque converter, a multi-stage transmission, and a steering device. The hydraulic device includes a first pump, a second pump, a connection switching unit, an operating state detector, and a switching controller. The first pump is connected to the multi-stage transmission and the steering device via a first hydraulic oil line, and the first pump discharges hydraulic oil. The second pump is either connected to the multi-stage transmission and the steering device via the first hydraulic oil line or is connected to the torque converter via a second hydraulic oil line, and the second pump discharges hydraulic oil. The connection switching unit selectively connects the second pump to either the first hydraulic oil line or the second hydraulic oil line on the basis of an inputted control signal. The operating state detector detects an operating state. Based on the operating state detected by the operating state detector, the switching controller controls switching operation of the connection switching unit to selectively connect the second pump either to the first hydraulic oil line or to the second hydraulic oil line. The switching controller inhibits the switching operation of the connection switching unit when the detected operating state is such that either at least one clutch of the multi-stage transmission and the steering device is in a state transition, or at least one brake of the steering device is being operated.

In the hydraulic device described above, the switching controller may be designed to perform a control so that the second pump is connected to the first hydraulic oil line in cases in which the operating state detected by the operating state detector is such that either the engine rotational speed is lower than a predetermined rotational speed or the hydraulic oil temperature is lower than a predetermined temperature, none of the clutches of the multi-stage transmission and steering device is in a state transition, and none of the brakes of the steering device is being operated.

A hydraulic device according to another aspect of the present invention is a hydraulic device for supplying hydraulic oil to a torque converter and to a brake driven by oil pressure. The hydraulic device includes a first hydraulic oil line, a first pump, a second hydraulic oil line, a second pump, a connection switching unit, an operating state detector, and a switching controller. The first hydraulic oil line is connected to the brakes. The first pump is connected to the brakes via the first hydraulic oil line, and the first pump discharges hydraulic oil. The second hydraulic oil line is connected to the torque converter. The second pump discharges hydraulic oil. The connection switching unit selectively connects the second pump to either the first hydraulic oil line or the second hydraulic oil line. The operating state detector detects an operating state. Based on the operating state detected by the operating state detector, the switching controller controls a switching operation of the connection switching unit to selectively connect the second pump either to the first hydraulic oil line or to the second hydraulic oil line. The switching controller inhibits the switching operation of the connection switching unit when the detected operating state indicates that the brake is being operated.

A hydraulic device according to another aspect of the present invention is a hydraulic device for supplying hydraulic oil to a multi-stage transmission and a torque converter. The multi-stage transmission has a plurality of gear-shifting clutches driven by oil pressure, and the multi-stage transmission performs speed level switching by switching the gear-shifting clutches. The hydraulic device comprises a first hydraulic oil line, a first pump, a second hydraulic oil line, a second pump, a connection switching unit, an operating state detector, and a switching controller. The first hydraulic oil line is connected to the gear-shifting clutches. The first pump is connected to the gear-shifting clutches via the first hydraulic oil line, and the first pump discharges hydraulic oil. The second hydraulic oil line is connected to the torque converter. The second pump discharges hydraulic oil. The connection switching unit selectively connects the second pump to either the first hydraulic oil line or the second hydraulic oil line. The operating state detector detects an operating state. Based on the operating state detected by the operating state detector, the switching controller controls a switching operation of the connection switching unit to selectively connect the second pump either to the first hydraulic oil line or to the second hydraulic oil line. The switching controller inhibits the switching operation of the connection switching unit when the detected operating state indicates that the gear-shifting clutch is in a state transition.

DETAILED DESCRIPTION OF THE PREFERRED EMBODIMENTS

A hydraulic device according to an embodiment of the present invention is described hereinbelow with reference to the drawings.

The hydraulic device according to the present embodiment is a hydraulic device for supplying hydraulic oil to a torque converter 2 capable of locking up, a multi-stage transmission 1, and a steering device 3, for example. The hydraulic device according to the present embodiment can be applied to a bulldozer or another work machine, for example.

Figure 1:
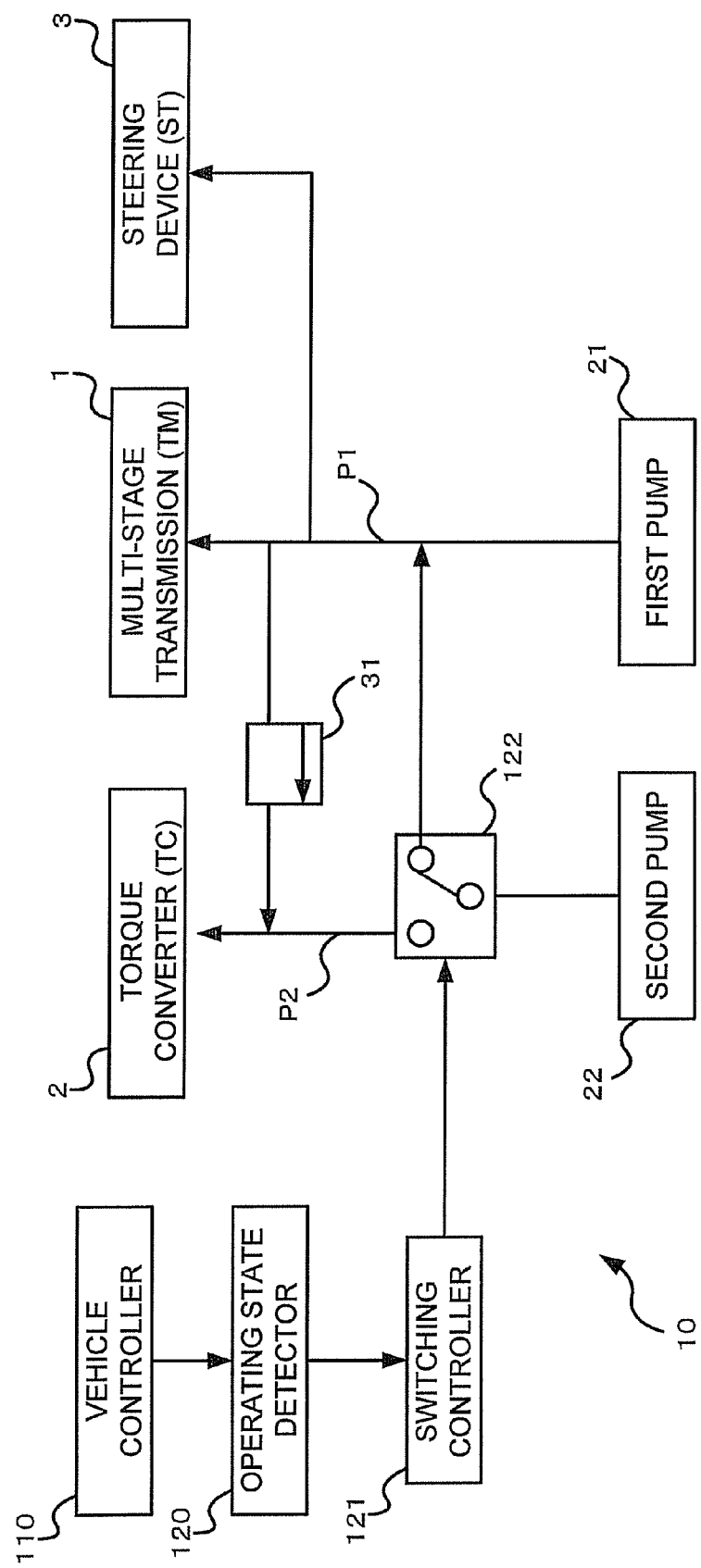
FIG. 1 is a structural diagram schematically depicting the functional configuration of a hydraulic device according to the first embodiment of the present invention.

FIG. 1 is a structural diagram schematically depicting the functional configuration of a hydraulic device 10 according to the present embodiment.

The multi-stage transmission 1 is configured so that a planetary gear mechanism is operated and gears are shifted by the selective engaging and releasing of a plurality of clutches.

In the present embodiment, the planetary gear mechanism of the multi-stage transmission 1 has a plurality of shifting gears, both for forward movement and for reverse movement. Incorporated into the multi-stage transmission 1 are a plurality of clutches for selecting these shifting gears, and one clutch for locking up the torque converter. The module in which the clutch and the hydraulic actuator (e.g., hydraulic piston) for engaging and releasing the clutch are joined together is referred to as a "clutch pack." Therefore, a plurality of clutch packs are incorporated into the multi-stage transmission 1 in the present embodiment.

The steering device 3 has a plurality of pairs of brakes and clutches (steering brakes and clutches). For example, when applied to a bulldozer, the steering device 3 comprises a brake and a clutch on both the left and right sides of the bulldozer. The steering device 3 is configured so as to cause the bulldozer to travel, stop, and change directions by operating or releasing the brakes and engaging or releasing the clutches simultaneously on the left and right sides, or by doing so on only one side.

In the present embodiment, for example, the clutches of the steering device 3 also constitute the aforementioned clutch pack. Furthermore, the brakes of the steering device 3 also comprise hydraulic actuators (e.g., hydraulic pistons) or the like for operating or releasing the brakes. Therefore, the steering device 3 of the present embodiment incorporates a pair of left and right clutch packs and a pair of left and right braking hydraulic actuators.

The hydraulic device 10 comprises a first pump 21, a second pump 22, a pressure regulator 31, a vehicle controller 110, an operating state detector 120, a switching controller 121, and a directional control valve 122 (connection switching unit), as shown in FIG. 1.

The vehicle controller 110 controls the engaging and releasing of the gears of the multi-stage transmission 1 on the basis of user commands or the operating state of the vehicle. The vehicle controller 110 also controls the operating and releasing of the brakes of the steering device 3. For example, the vehicle controller 110 outputs a gearshift command to the multi-stage transmission 1 or sends a braking command to the steering device 3, and controls the multi-stage transmission 1 and the steering device 3.

The hydraulic device 10 according to the present embodiment comprises a plurality of gear pumps (first pump 21 and second pump 22) as pumps for supplying hydraulic oil to the multi-stage transmission 1 and the steering device 3. In the present embodiment, instead of ensuring the necessary flow rate of hydraulic oil using a single large pump, the necessary flow rate is obtained by combining a plurality of pumps 21, 22. Since the gear pump is driven by an engine, the amount of discharged oil increases when the engine rotational speed increases. In a hydraulic oil temperature range in which leaking in the hydraulic device due to decreased oil viscosity is not severe, the oil viscosity of the hydraulic oil decreases when the hydraulic oil temperature increases, and pressure loss in the hydraulic oil line decreases.

The first pump 21 is constantly connected to the multi-stage transmission 1 and the steering device 3 via a first hydraulic oil line P1, and the first pump 21 supplies hydraulic oil to the multi-stage transmission 1 and the steering device 3. The pressure of the first hydraulic oil line P1 is regulated by the pressure regulator 31, which is configured as a relief valve, for example. The excess oil from the pressure regulator 31 is supplied to the torque converter 2 via a second hydraulic oil line P2.

The second pump 22 is configured from a solenoid valve for example, and is connected to either the first hydraulic oil line P1 or the second hydraulic oil line P2 via the directional control valve 122 which switches the connection. In cases in which the second pump 22 is connected to the first hydraulic oil line P1, hydraulic oil from the first pump 21 and the second pump 22 flows into the first hydraulic oil line P1, and this hydraulic oil is supplied to the multi-stage transmission 1 and the steering device 3. Specifically, this case is a state in which the second pump 22 assists the first pump 21. In cases in which the second pump 22 is connected to the second hydraulic oil line P2, only hydraulic oil discharged from the first pump 21 flows into the first hydraulic oil line P1, while hydraulic oil discharged from the second pump 22 and excess oil from the pressure regulator 31 flow into the second hydraulic oil line P2. The load on the second pump 22 decreases because the torque converter 2 comprises a hydraulic circuit that operates at a lower pressure compared to the multi-stage transmission 1.

The switching controller 121 controls the switching of the connection of the directional control valve 122 on the basis of the operating state of the vehicle. For example, the switching controller 121 switches the connection of the second pump 22 to either the first hydraulic oil line P1 or the second hydraulic oil line P2 by outputting a solenoid command to the directional control valve 122.

The operating state detector 120 detects the hydraulic oil temperature and the engine rotational speed, for example. Based on gearshift commands outputted by the vehicle controller 110, the operating state detector 120 also detects the selected shifting gears and the state of clutches of the multi-stage transmission 1. Furthermore, the operating state detector 120 detects the state of the brakes and clutches of the steering device 3 on the basis of brake commands outputted by the vehicle controller 110.

The switching controller 121 connects the second pump 22 to the first hydraulic oil line P1 via the directional control valve 122 in cases in which the hydraulic oil temperature is lower than a predetermined temperature or the engine rotational speed is lower than a predetermined rotational speed. When the hydraulic oil has a predetermined low temperature or the engine rotational speed is a predetermined low speed, the hydraulic oil supplied by the second pump 22 is thereby supplied to the multi-stage transmission 1 and steering device 3 to assist the first pump 21. As a result, a sufficient amount of hydraulic oil can be supplied to the multi-stage transmission 1 and the steering device 3 by the assistance of the second pump, even in cases in which the amount of oil is insufficient with only the hydraulic oil discharged by the first pump when the hydraulic oil has a low temperature or the engine rotational speed is low.

The reasons are as follows for the amount of hydraulic oil being insufficient when the hydraulic oil temperature is low or when the engine rotational speed is low. Specifically, since the first pump 21 is driven by the engine, the amount of hydraulic oil discharged decreases when the engine rotational speed is low. The hydraulic oil has a high viscosity when the hydraulic oil is at a predetermined low temperature (e.g., substantially the same temperature as the outside air temperature). Therefore, pressure loss in the first hydraulic oil line P1 is high, and a large amount of hydraulic oil is needed in order to obtain the necessary hydraulic oil pressure in the multi-stage transmission 1 and the steering device 3. In other words, when the hydraulic oil temperature is lower than a reference temperature for when normal work is being performed, the amount of hydraulic oil discharged from the first pump 21 apparently decreases.

Therefore, when it has been determined that the temperature of the hydraulic oil detected by the operating state detector 120 is lower than a predetermined temperature or that the engine rotational speed is lower than a predetermined rotational speed, the switching controller 121 determines the state of the directional control valve 122 (to which of the first hydraulic oil line P1 or the second hydraulic oil line P2 it is connected) on the basis of its own solenoid command. At this time, if the directional control valve 122 is connected to the second hydraulic oil line P2, the switching controller 121 switches the connection to the first hydraulic oil line P1, and if the directional control valve 122 is connected to the first hydraulic oil line P1, the switching controller 121 performs a control so as to maintain this state. Most of the hydraulic oil supplied to the first hydraulic oil line P1 is reduced in pressure by the pressure regulator 31 and is supplied to the torque converter 2.

The general principle of the hydraulic device 10 according to the present embodiment is that the second pump 22 assists the first pump 21 when the hydraulic oil is low in temperature or when the engine rotational speed is low. Therefore, if the directional control valve 122 is connected to the second hydraulic oil line P2 when the hydraulic oil temperature or the engine rotational speed fulfills the conditions described above, the general principle is that an action be performed for switching the connection of the directional control valve 122 to the first hydraulic oil line P1 on the basis of a command from the switching controller 121 as described above.

However, the connection of the directional control valve 122 is not switched in cases such as the following, even when the hydraulic oil has a predetermined low temperature or the engine rotational speed is a predetermined low speed. When the clutches of either the multi-stage transmission 1 or the steering device 3 transition to another state, or when either brake of the steering device 3 is being operated, the switching controller 121 does not issue any switching commands even if the hydraulic oil temperature or the engine rotational speed fulfill the conditions described above.

The term "state transition" (or simply "transition") of a clutch refers to the time that any clutch changes its state from being released to connected or from being connected to released in order to switch shifting gears or the like. For example, during the time that hydraulic oil is being injected in order to fill any clutch pack with hydraulic oil, the clutch associated with that clutch pack will be in transition.

During a clutch transition, the clutches must be operated smoothly and quickly. This is because gearshift shock occurs and makes the ride unpleasant when the clutches are coupled suddenly, and gear-shifting (switching of the gears) is time-consuming when the clutch action is slow. Therefore, hydraulic oil must be injected with precision into the clutch pack in order for the clutches to be operated smoothly and quickly. Therefore, if the connection of the directional control valve 122 is switched and the supplied amount of hydraulic oil suddenly changes during a clutch state transition, it is difficult to operate the clutches smoothly and quickly.

The brakes of the steering device 3 are also operated by hydraulic cylinders. Therefore, if the amount of hydraulic oil supplied to these hydraulic cylinders suddenly changes when the brakes are being activated, the effectiveness of the brakes may suddenly change.

In view of this, in the present embodiment, switching of the directional control valve 122 is inhibited when the clutches of either the multi-stage transmission 1 or the steering device 3 are in transition and when either brake of the steering device 3 is operating, even if the hydraulic oil has a low temperature or the engine rotational speed is a predetermined low speed as described above.

Figure 2:
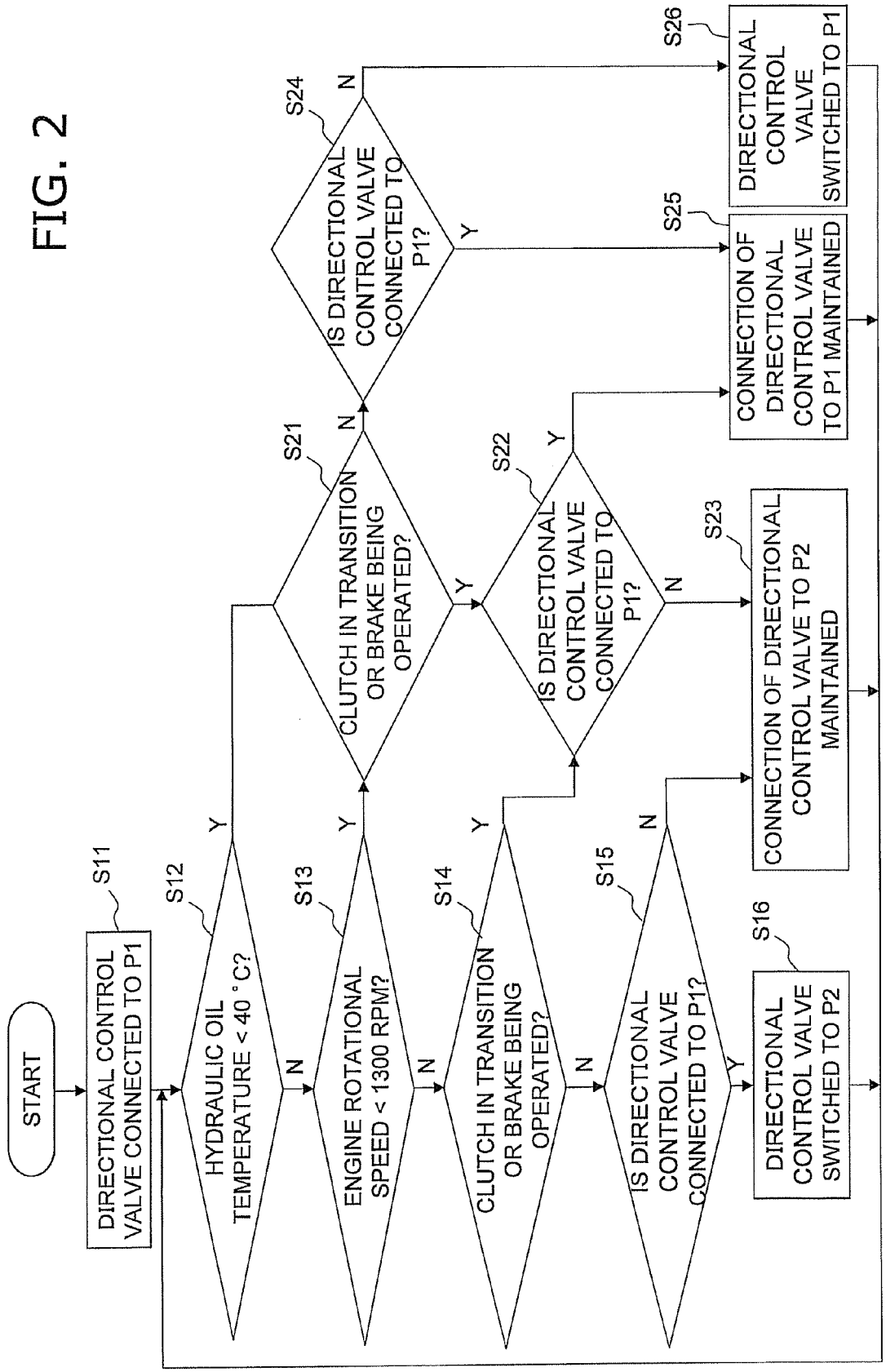
FIG. 2 is a flowchart showing the process sequence of switching the connection of the second pump in the hydraulic device according to the first embodiment of the present invention.

FIG. 2 is a flowchart showing the process sequence of switching the connection of the second pump in the hydraulic device comprising the configuration described above. The process of this flowchart is started when the engine of the work machine starts up and is ended when the engine stops, for example.

The switching controller 121 first controls the directional control valve 122, connects the second pump 22 to the first hydraulic oil line P1, and initializes the state of the directional control valve 122 (S11).

Next, the current operating state of the vehicle as detected by the operating state detector 120 is determined. Specifically, a determination is made as to whether or not the hydraulic oil temperature is less than a predetermined temperature (e.g., 40° C.) (S12), or whether or not the engine rotational speed is less than a predetermined rotational speed (e.g., 1300 rpm) (S13). The predetermined temperature is a lower temperature than the reference temperature during normal work, and is more specifically equivalent to maximum supposable outside air temperature.

When the hydraulic oil temperature is equal to or greater than the predetermined temperature (S12: No) and the engine rotational speed is equal to or greater than the predetermined rotational speed (S13: No), the switching controller 121 determines the states of the clutches and brakes of the multi-stage transmission 1 and the steering device 3 as detected by the operating state detector 120. Specifically, the switching controller 121 determines whether or not any of the clutches of the multi-stage transmission 1 or steering device 3 are in transition, or whether or not the steering device 3 is operating the brake (S14).

When none of the clutches of the multi-stage transmission 1 or steering device 3 are in transition and the steering device 3 is not operating any brakes (S14: No), the switching controller 121 determines the state of the directional control valve 122 (S15).

When the directional control valve 122 is connected to the first hydraulic oil line P1 (S15: Yes), the switching controller 121 operates the directional control valve 122 and switches the connection of the second pump 22 to the second hydraulic oil line P2 (S16). When the directional control valve 122 is already connected to the second hydraulic oil line P2 (S15: No), the switching controller 121 controls the directional control valve 122 and maintains the connection of the second pump 22 with the second hydraulic oil line P2 (S23).

In other words, the hydraulic device 10 according to the present embodiment supplies the hydraulic oil discharged by the second pump to the torque converter 2 when the hydraulic oil temperature is equal to or greater than a predetermined temperature and the engine rotational speed is equal to or greater than a predetermined rotational speed.

In steps S12 and S13, when the hydraulic oil temperature is lower than the predetermined temperature (S12: Yes) or the engine rotational speed is lower than the predetermined rotational speed (S13: Yes), the switching controller 121 determines the states of the clutches and brakes of the multi-stage transmission 1 and steering device 3 as detected by the operating state detector 120. Specifically, the switching controller 121 determines whether or not any of the clutches of the multi-stage transmission 1 or steering device 3 are in transition, or whether or not the steering device 3 is operating the brake (S21).

When either any of clutches of the multi-stage transmission 1 or steering device 3 are in transition or the brake is being operated by the steering device 3 (S21: Yes), the switching controller 121 determines the state of the directional control valve 122 (S22).

When the directional control valve 122 is connected to the second hydraulic oil line P2 (S22: No), the switching controller 121 performs a control so that the directional control valve 122 remains connected with the second hydraulic oil line P2 (S23). When the directional control valve 122 is connected to the first hydraulic oil line P1 (S22: Yes), the switching controller 121 performs a control so that the directional control valve 122 remains connected with the first hydraulic oil line P1 (S25).

In other words, the switching action of the directional control valve 122 is inhibited either when any of the clutches of the multi-stage transmission 1 or steering device 3 are in transition, or when the steering device 3 is operating the brake.

Next, in step S21, when none of the clutches of the multi-stage transmission 1 or steering device 3 is in transition and the steering device 3 is not operating any brakes (S21: No), the switching controller 121 determines the state of the directional control valve 122 (S24).

When the directional control valve 122 is connected to the first hydraulic oil line P1 (S24: Yes), the switching controller 121 performs a control so that the directional control valve 122 remains connected to the first hydraulic oil line P1 (S25). When the directional control valve 122 is connected to the second hydraulic oil line P2 (S24: No), the switching controller 121 performs a control so that the connection of the directional control valve 122 is switched to the first hydraulic oil line P1 (S26).

In other words, in cases in which the hydraulic oil temperature is lower than the predetermined temperature or the engine rotational speed is lower than the predetermined rotational speed, the hydraulic device 10 according to the present embodiment supplies the hydraulic oil discharged by the second pump to the multi-stage transmission 1 and the steering device 3 when none of the clutches of the multi-stage transmission 1 or steering device 3 are in transition and the steering device 3 is not operating any brakes.

After the engine is started up, the process from step S12 onward is repeated.

According to the present embodiment, since the amount of oil discharged when the hydraulic oil is at a high temperature or the engine is rotating at a high speed is used as a reference to establish the size of the first pump, the supply of hydraulic oil from the second pump can be received and the necessary oil amount and oil pressure can be ensured, even in cases in which the multi-stage transmission 1 and steering device 3 are not being supplied with enough hydraulic oil from the first pump. As a result, loss in the hydraulic device can be reduced without compromising the response of the clutches and brakes.

Furthermore, according to the present embodiment, even though it is possible to switch the hydraulic oil discharged by the second pump to the first hydraulic oil line P1, shock during gear-shifting and sudden changes in brake effectiveness can be avoided by inhibiting switching of the connection of the second pump when the clutch state is in transition and when the brakes are being operated.

Second Embodiment

Figure 3:
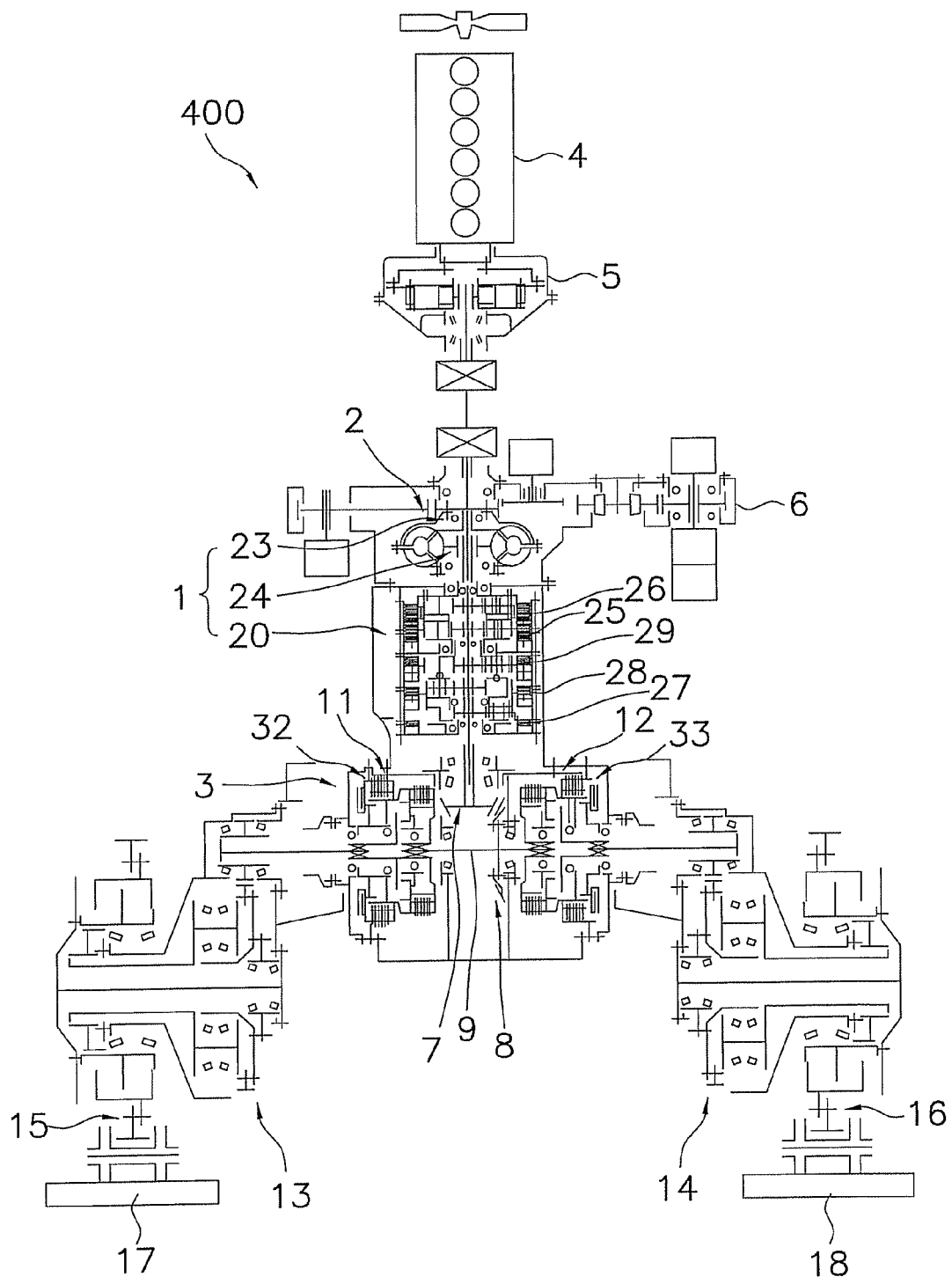
FIG. 3 is a schematic drawing showing the configuration of the power transmission system of the work machine according to the second embodiment of the present invention.

A schematic system structural drawing of a work machine 400 according to the second embodiment of the present invention is shown in FIG. 3. This work machine 400 is a bulldozer, for example, and the work machine 400 can perform pushing soil and other work with a blade (not shown) provided at the front part of the vehicle.

Configuration of Power Transmission System

In this work machine 400, driving force from an engine 4 is transmitted to a torque converter 2 via a damper 5 and a PTO 6. The output shaft of the torque converter 2 is linked to an input shaft of a gearshift mechanism 20, and driving force is transmitted from the torque converter 2 to the gearshift mechanism 20. Driving force outputted from the gearshift mechanism 20 is transmitted to a horizontal shaft 9 via a first bevel gear 7 and a second bevel gear 8. The driving force transmitted to the horizontal shaft 9 is transmitted to a left sprocket wheel 15 via a left steering clutch 11 and a left final reduction gear 13. The driving force transmitted to the horizontal shaft 9 is also transmitted to a right sprocket wheel 16 via a right steering clutch 12 and a right final reduction gear 14. Each of crawler belts 17, 18 is wound around the sprocket wheels 15, 16 respectively. Therefore, when the sprocket wheels 15, 16 are rotatably driven, the crawler belts 17, 18 are driven, whereby the work machine 400 travels.

A lock-up clutch 23 is provided to the torque converter 2. The lock-up clutch 23 is switched between an engaged state and a disengaged state by oil pressure. When the lock-up clutch 23 is in the engaged state, the input shaft and output shaft of the torque converter 2 are in a state of being linked, and the driving force from the engine 4 is transmitted to the gearshift mechanism 20 directly (this state is hereinbelow referred to as a "lock-up state"). When the lock-up clutch 23 is in the disengaged state, driving force from the engine 4 is transmitted to the gearshift mechanism 20 via the torque converter 2 (this state is hereinbelow referred to as a "torque converter state"). The lock-up clutch 23 is put into the engaged state by a supply of hydraulic oil from a first hydraulic oil line P1, described hereinafter. The lock-up clutch 23 is put into the disengaged state by the discharge of hydraulic oil.

A stator clutch 24 is also provided to the torque converter 2. The stator clutch 24 is switched between an engaged state and a disengaged state by oil pressure. In the torque converter state, the stator clutch 24 goes into the engaged state. In the lock-up state, the stator clutch 24 goes into the disengaged state. The stator clutch 24 is put into the engaged state by the supply of hydraulic oil from the first hydraulic oil line P1, described hereinafter. The stator clutch 24 is put into the disengaged state by the discharge of hydraulic oil.

Figure 4:
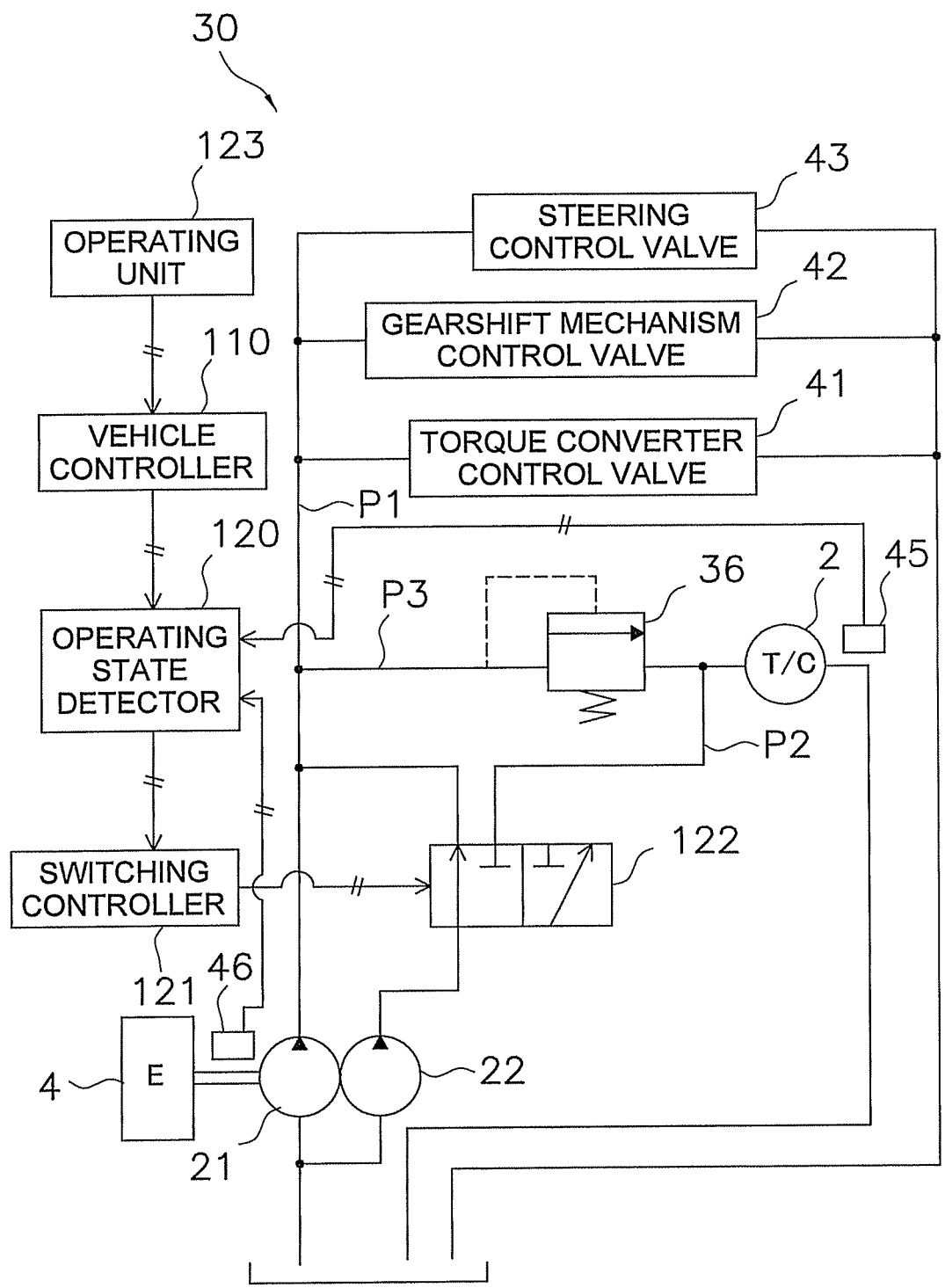
FIG. 4 is a schematic diagram showing the configuration of a hydraulic device of the work machine according to the second embodiment.

The supply and discharge of hydraulic oil to the lock-up clutch 23 and the supply and discharge of hydraulic oil to the stator clutch 24 are controlled by a torque converter control valve 41 (see FIG. 4).

The gearshift mechanism 20 has a forward clutch 25, a reverse clutch 26, and a plurality of gearshift clutches 27 to 29. The gearshift clutches 27 to 29 include a first speed clutch 27, a second speed clutch 28, and a third speed clutch 29. The clutches 21 to 25 are hydraulic clutches that can be switched between an engaged state and a disengaged state by oil pressure. The clutches 25 to 29 are put into the engaged state by the supply of hydraulic oil from the first hydraulic oil line P1, described hereinafter. The clutches 25 to 29 are put into the disengaged state by the discharge of hydraulic oil. The supply and discharge of hydraulic oil to the clutches 25 to 29 is controlled by a gearshift mechanism control valve 42 (see FIG. 4).

The forward clutch 25 and the reverse clutch 26 are clutches for switching the vehicle between forward and reverse travel. When the forward clutch 25 is put into the engaged state, the reverse clutch 26 is put into the disengaged state. When the reverse clutch 26 is put into the engaged state, the forward clutch 25 is put into the disengaged state.

The first speed clutch 27, the second speed clutch 28, and the third speed clutch 29 are provided in correspondence with a plurality of shifting gear trains having different gearshift ratios. The speed level of the gearshift mechanism 20 is switched by any of the clutches 23 to 25 being put into the engaged state. In the work machine 400, three speeds are possible for both forward and reverse travel respectively.

The gearshift mechanism 20, the lock-up clutch 23, and the stator clutch 24 constitute a multi-stage transmission 1.

The right steering clutch 12 and the left steering clutch 11 are hydraulic clutches that can be switched between an engaged state and a disengaged state by oil pressure. These steering clutches 11, 12 are put into the engaged state by the supply of hydraulic oil from the first hydraulic oil line P1, described hereinafter. The steering clutches 11, 12 are put into the disengaged state by the discharge of hydraulic oil. The supply and discharge of hydraulic oil to the steering clutches 11, 12 are controlled by a steering control valve 43 (see FIG. 4). When the right steering clutch 12 is in the engaged state, driving force from the second bevel gear 8 is transmitted to the right sprocket wheel 16. When the left steering clutch 11 is in the engaged state, driving force from the second bevel gear 8 is transmitted to the left sprocket wheel 15.

In the driving force transmission path, a left brake 32 is provided between the left steering clutch 11 and the left final reduction gear 13. The left brake 32 can brake the rotation of the left sprocket wheel 15. A right brake 33 is provided between the right steering clutch 12 and the right final reduction gear 14. The right brake 33 can brake the rotation of the right sprocket wheel 16. Hydraulic oil from the first hydraulic oil line P1, described hereinafter, is supplied to these brakes 32, 33, and the brakes 32, 33 are switched between a braking state and a non-braking state by the oil pressure. The brakes 32, 33 are so-called negative brakes, going into the non-braking state when a predetermined high oil pressure is applied, and going into the braking state when a predetermined low oil pressure is applied. The supply and discharge of hydraulic oil to the brakes 32, 33 are controlled by the aforementioned steering control valve 43 (see FIG. 4).

The aforementioned right steering clutch 12, right brake 33, left steering clutch 11, and left brake 32 constitute a steering device 3 for turning the vehicle. Specifically, the left and right turning action of the work machine 400 is controlled by controlling the right steering clutch 12, the right brake 33, the left steering clutch 11, and the left brake 32. For example, when the left sprocket wheel 15 is rotatably driven while the right steering clutch 12 is in the disengaged state and the right brake 33 is in the braking state, the work machine 400 turns to the right. When the right sprocket wheel 16 is rotatably driven while the left steering clutch 11 is in the disengaged state and the left brake 32 is in the braking state, the work machine 400 turns to the left.

Configuration of Hydraulic Device

The work machine 400 comprises a hydraulic device 30 for supplying hydraulic oil to the torque converter 2, the multi-stage transmission 1, and the steering device 3, as shown in FIG. 4. The hydraulic device 30 comprises a first hydraulic oil line P1, a first pump 21, a second hydraulic oil line P2, a second pump 22, a third hydraulic oil line P3, a directional control valve 122, an operating state detector 120, and a switching controller 121.

The first hydraulic oil line P1 is connected to the torque converter control valve 41, the gearshift mechanism control valve 42, and the steering control valve 43. The torque converter control valve 41 is connected to the lock-up clutch 23 (see FIG. 3) and the stator clutch 24 (see FIG. 3). The gearshift mechanism control valve 42 is connected to the gearshift mechanism 20 (see FIG. 3). The steering control valve 43 is connected to the steering device 3 (see FIG. 3). Therefore, the first hydraulic oil line P1 is connected to the multi-stage transmission 1 and the steering device 3 via these control valves 41 to 43.

The first pump 21 is a gear pump or another fixed-displacement pump, and is driven by the engine 4 to discharge hydraulic oil. The first pump 21 is connected to the torque converter control valve 41, the gearshift mechanism control valve 42, and the steering control valve 43 via the first hydraulic oil line P1. Consequently, the first pump 21 is constantly connected to the multi-stage transmission 1 and the steering device 3, and the first pump 21 supplies hydraulic oil to the multi-stage transmission 1 and the steering device 3.

The second hydraulic oil line P2 is connected to the directional control valve 122 and the torque converter 2. The second hydraulic oil line P2 supplies hydraulic oil to the torque converter 2.

The second pump 22 is a gear pump or another fixed-displacement pump, and is driven by the engine 4 to discharge hydraulic oil. The second pump 22 is a hydraulic pump of greater capacity than the first pump 21. The second pump 22 is connected to either one of the first hydraulic oil line P1 or second hydraulic oil line P2 via the directional control valve 122.

The third hydraulic oil line P3 connects the first hydraulic oil line P1 and the second hydraulic oil line P2. The third hydraulic oil line P3 is provided with a relief valve 36. The relief valve 36 inhibits the flow of hydraulic oil between the first hydraulic oil line P1 and the second hydraulic oil line P2 in cases in which the oil pressure of the first hydraulic oil line P1 is lower than a predetermined relief pressure. The relief valve 36 also allows the flow of hydraulic oil from the first hydraulic oil line P1 to the second hydraulic oil line P2 in cases in which the oil pressure of the first hydraulic oil line P1 is equal to or greater than the predetermined relief pressure. The oil pressure of the first hydraulic oil line P1 is thereby regulated.

The directional control valve 122 is a solenoid valve, for example, and the directional control valve 122 switches the connection of the second pump 22 in accordance with a command signal from the switching controller 121. Hydraulic oil from both the first pump 21 and second pump 22 flows into the first hydraulic oil line P1 while the second pump 22 is connected to the first hydraulic oil line P1 via the directional control valve 122. Consequently, hydraulic oil from the first pump 21 and second pump 22 is supplied to the multi-stage transmission 1 and the steering device 3. In other words, a state is achieved in which the second pump 22 assists the first pump 21. Only hydraulic oil discharged from the first pump 21 flows into the first hydraulic oil line P1 while the second pump 22 is connected to the second hydraulic oil line P2 via the directional control valve 122. Hydraulic oil discharged from the second pump 22 and excess oil from the relief valve 36 also flow into the second hydraulic oil line P2.

The operating state detector 120 has a hydraulic oil temperature sensor 45 and an engine rotational speed sensor 46. The hydraulic oil temperature sensor 45 detects the temperature of the hydraulic oil. For example, the hydraulic oil temperature sensor 45 detects the temperature of hydraulic oil in the outlet side of the torque converter 2. The engine rotational speed sensor 46 detects the engine rotational speed. The operating state detector 120 detects the states of the clutches 23 to 29 of the multi-stage transmission 1 on the basis of gearshift commands outputted by a vehicle controller 110. Furthermore, the operating state detector 120 detects the states of the brakes 32, 33 of the steering device 3 and the steering clutches 11, 12 on the basis of brake commands outputted by the vehicle controller 110.

The switching controller 121 controls the switching of the connection of the directional control valve 122 on the basis of the operating state of the vehicle. The switching controller 121 switches the connection of the second pump 22 to either the first hydraulic oil line P1 or the second hydraulic oil line P2 by outputting a command signal to the directional control valve 122. Specifically, the switching controller 121 connects the second pump 22 to the first hydraulic oil line P1 via the directional control valve 122 in cases in which the hydraulic oil temperature is lower than a predetermined temperature or the engine rotational speed is lower than a predetermined rotational speed. The hydraulic oil supplied by the second pump 22 is thereby supplied to the multi-stage transmission 1 and the steering device 3, assisting the first pump 21, when the hydraulic oil is at a predetermined low temperature or the engine rotational speed is a predetermined low speed. As a result, a sufficient amount of hydraulic oil can be supplied to the multi-stage transmission 1 and steering device 3 by the assistance of the second pump 22, even in cases in which the amount of oil is insufficient with only the hydraulic oil discharged by the first pump 21.

Configuration of Operating Unit 123 and Vehicle Controller 110

The work machine 400 comprises the vehicle controller 110 and an operating unit 123.

The vehicle controller 110 controls the switching of the lock-up clutch 23 and stator clutch 24, and also the switching of the clutches 25 to 29 of the gearshift mechanism 20, on the basis of user commands and the operating state of the vehicle. The vehicle controller 110 also controls the switching of the brakes 32, 33 of the steering device 3 and the switching of the steering clutches 11, 12.

The operating unit 123 is for commanding the work machine 400 to perform various actions, by being operated by an operator. The operating unit 123 has, e.g., a gearshift lever, a travel lever, a brake pedal, and the like. The operator can direct the switching between forward and reverse travel, the switching of speed levels, and the switching between travelling straight and turning by operating the operating unit 123. The operator can also direct the switching between the braking state and the non-braking state of the brakes 32, 33 by operating the operating unit 123.

Switching Control of Forward/Reverse Travel and Speed Levels

The following is a detailed description of the control of the clutches when switches are made between forward and reverse travel and between speed levels.

When commands are issued for switches between forward and reverse travel and between speed levels, first, clutches in an engaged state are put into a disengaged state. Next, the selected clutches are switched from the disengaged state to the engaged state. At this time, the instructed oil pressure to the clutches is controlled so that the clutch pressure changes with a predetermined waveform.

Figure 5:
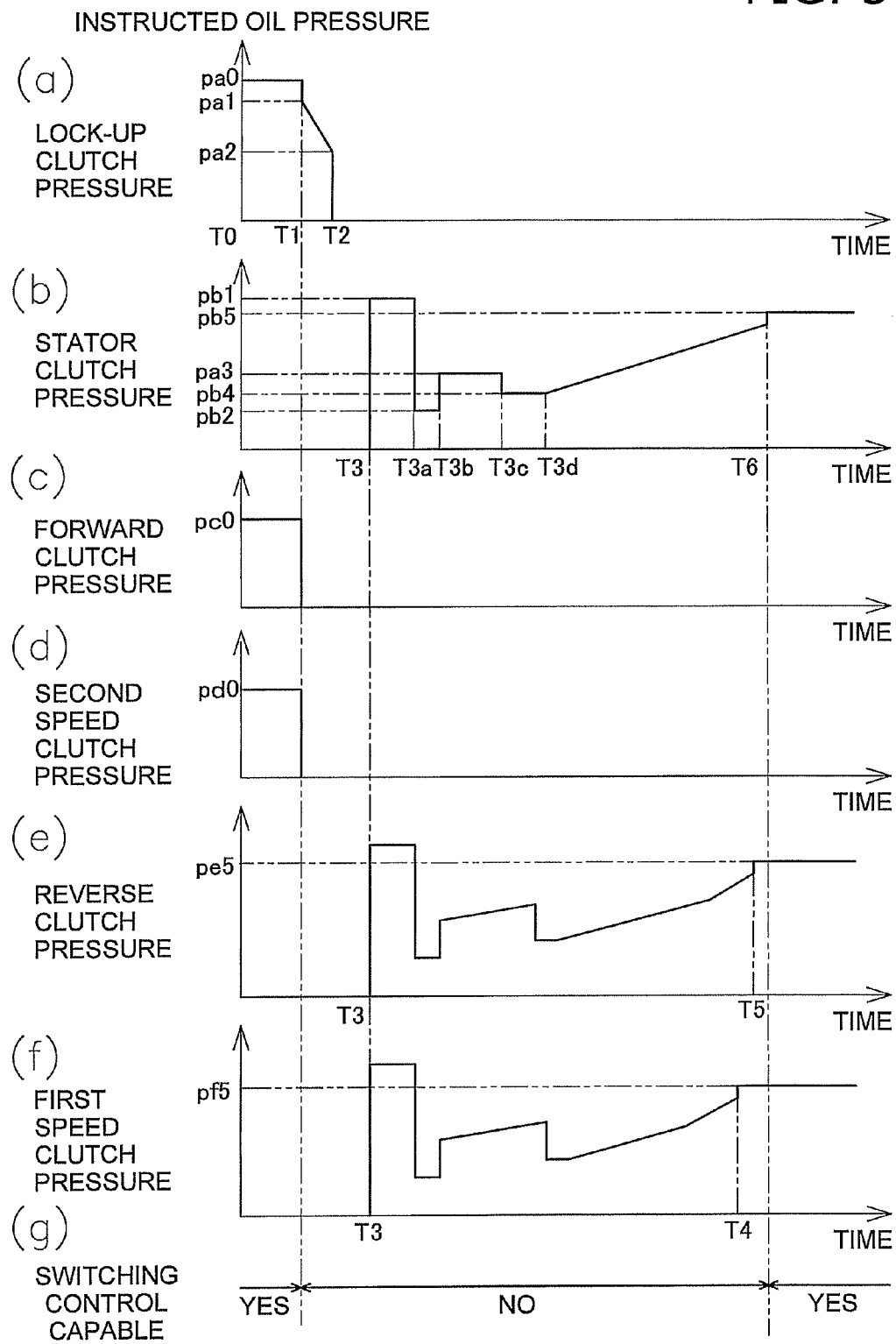
FIG. 5 is a timing chart showing an example of clutch oil pressure control in the work machine according to the second embodiment.

Specifically, the instructed oil pressure to the clutches is controlled as shown in the timing chart in FIG. 5. FIG. 5 shows the change in instructed oil pressure to the lock-up clutch 23, the stator clutch 24, the forward clutch 25, the second speed clutch 28, the reverse clutch 26, and the first speed clutch 27 when a switch is made from a forward second-speed lock-up state to a reverse first-speed torque converter state.

First, before switching is initiated (time T0), the lock-up clutch pressure, the forward clutch pressure, and the second speed clutch pressure are maintained at predetermined holding pressures pa0, pc0, and pd0, respectively. Consequently, the lock-up clutch 23, the forward clutch 25, and the second speed clutch 28 are all maintained in an engaged state. The stator clutch pressure, the reverse clutch pressure, and the first speed clutch pressure are all zero. Consequently, the stator clutch 24, the reverse clutch 26, and the first speed clutch 27 are all maintained in a disengaged state.

Next, when a command to switch between forward and reverse travel and between speed levels is issued (time T1), a control is performed so that the instructed oil pressure to the lock-up clutch changes with a predetermined waveform. Specifically, the lock-up clutch pressure decreases to a predetermined first oil pressure Pa1 at time T1, then gradually decreases thereafter from the first oil pressure Pa1 to a second oil pressure Pa2, and reaches zero at time T2. The forward clutch pressure and the second speed clutch pressure both decrease to zero at time T1.

Next, at time T3, oil pressure control is initiated for the stator clutch pressure, the reverse clutch pressure, and the first speed clutch pressure. The stator clutch pressure is controlled so as to change with a predetermined waveform from time T3 to time T6, and is maintained at a predetermined holding pressure Pb5 from time T6 onward. From time T3 to time T6, hydraulic oil is injected into the clutch pack of the stator clutch 24, and engagement of the stator clutch 24 is initiated. At time T6, engagement of the stator clutch 24 is completed. Specifically, the stator clutch pressure is held at a trigger pressure Pb1 (time T3 to T3$a$), a standby pressure Pb2 (time T3$a$ to T3$b$), a filling pressure Pb3 (time T3$b$ to T3$c$), and an initial pressure Pb4 (time T3$c$ to T3$d$). The stator clutch pressure then changes so as to gradually increase from the initial pressure Pb4 to the holding pressure Pb5 (time T3$d$ to T6). The reverse clutch pressure is similarly controlled so as to have a predetermined waveform from time T3 to time T5, and is maintained at a predetermined holding pressure pe5 from time T5 onward. The first speed clutch pressure is controlled so as to have a predetermined waveform from time T3 to time T4, and is maintained at a predetermined holding pressure pf5 from time T4 onward. In the manner described above, the stator clutch 24, the reverse clutch 26, and the first speed clutch 27 go into the engaged state.

Figure 6:
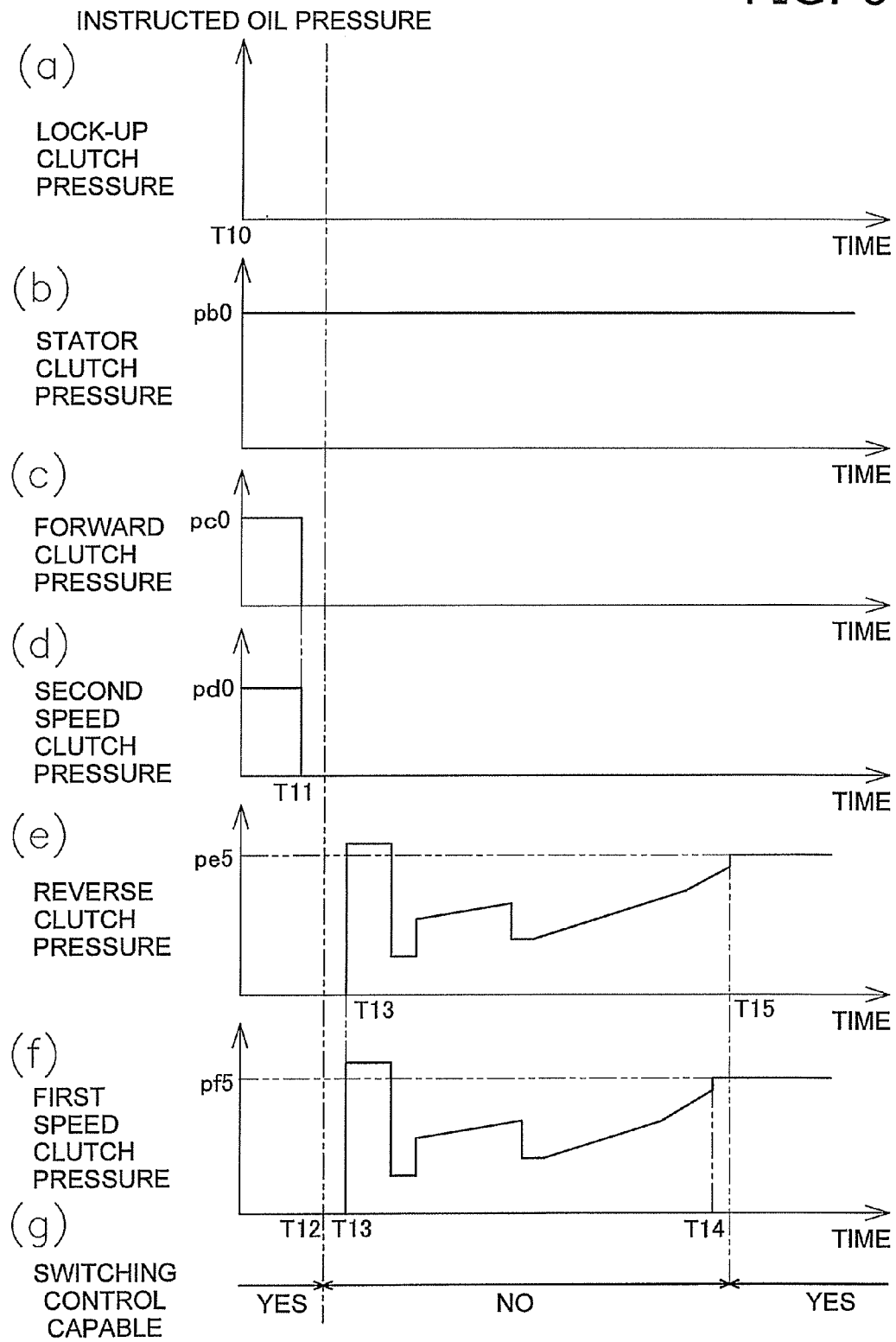
FIG. 6 is a timing chart showing an example of clutch oil pressure control in the work machine according to the second embodiment.

Next, FIG. 6 shows a timing chart of when a switch is made from the forward second-speed torque converter state to the reverse first-speed torque converter state. FIG. 6 shows the change in instructed oil pressure to the lock-up clutch 23, the stator clutch 24, the forward clutch 25, the second speed clutch 28, the reverse clutch 26, and the first speed clutch 27 when a switch is made from the forward second-speed torque converter state to the reverse first-speed torque converter state.

First, before switching is initiated (time T10), the stator clutch pressure, the forward clutch pressure, and the second speed clutch pressure are maintained at respective predetermined holding pressures pb0, pc0, pd0. Consequently, the stator clutch 24, the forward clutch 25, and the second speed clutch 28 are maintained in their respective engaged states. The lock-up clutch pressure, the reverse clutch pressure, and the first speed clutch pressure are all zero. Consequently, the lock-up clutch 23, the reverse clutch 26, and the first speed clutch 27 are maintained in their respective disengaged states.

Next, when a command is issued to switch the speed level (time T11), the forward clutch pressure and the second speed clutch pressure both decrease to zero. Since the lock-up clutch 23 is not switched herein, the stator clutch 24 does not change from the holding pressure pb0, and the lock-up clutch pressure also does not change from zero.

Next, at time T13, oil pressure control is initiated for the reverse clutch pressure and the first speed clutch pressure. The first speed clutch pressure is controlled so as to change with a predetermined waveform from time T13 to time T14, and is maintained at a predetermined holding pressure pf5 from time T14 onward. From time T13 to time T14, hydraulic oil is injected into the clutch pack of the first speed clutch 27, and engagement of the first speed clutch 27 is initiated. At time T14, engagement of the first speed clutch 27 is completed. Similarly, the reverse clutch pressure is controlled so as to change with a predetermined waveform from time T13 to time T15, and is maintained at a predetermined holding pressure pe5 from time T15 onward. In the manner described above, the reverse clutch 26 and the first speed clutch 27 go into the engaged state.

When the right steering clutch 12 and left steering clutch 11 are switched, the same oil pressure control as that of the gear-shifting clutches described above is performed.

Switching Control for Brakes 32, 33

Figure 7:
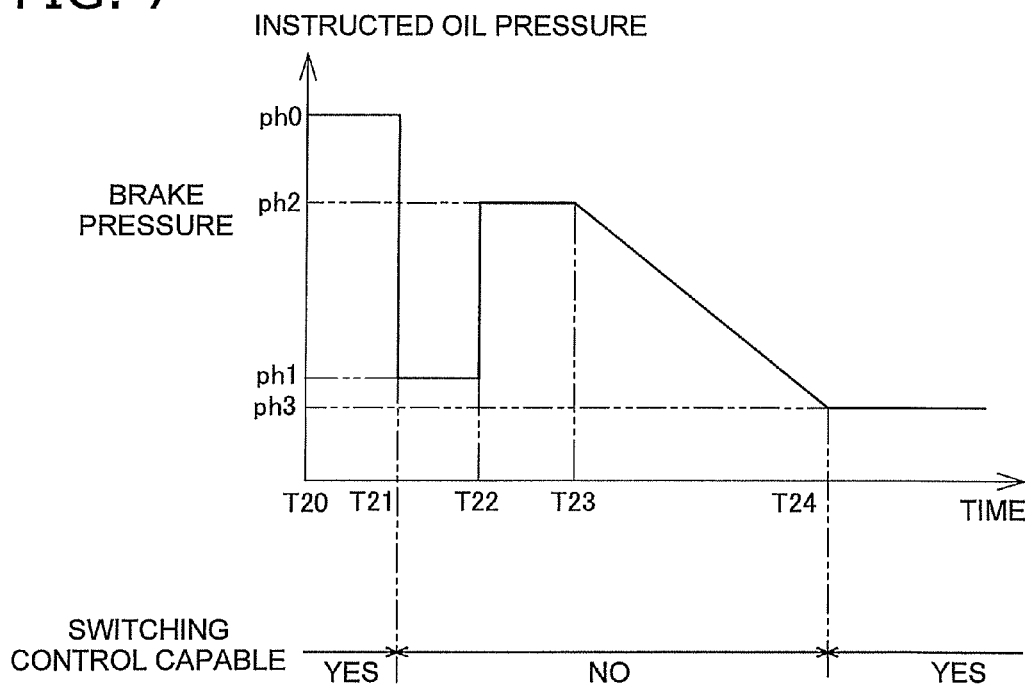
FIG. 7 is a timing chart showing an example of brake oil pressure control in the work machine according to the second embodiment.

Next, switching control for the brakes 32, 33 when the operating unit 123 is operated will be described. FIG. 7 is a timing chart showing the changes in instructed oil pressure to the brakes 32, 33 in cases in which the brakes 32, 33 are switched from a non-braking state to a braking state.

First, before switching is initiated (time T20), the brake pressure is maintained at a predetermined holding pressure ph0. As described above, since the brakes 32, 33 are negative brakes, maintaining the brake pressure at the predetermined holding pressure ph0 causes the brakes 32, 33 to be maintained in the non-braking state.

When the operating unit 123 is operated (time T21), the instructed oil pressure to the brakes 32, 33 is controlled so that the brake pressure changes with a predetermined waveform (time T21 to T24). Specifically, the brake pressure is held at a trigger pressure ph1 (time T21 to T22) and an upper limit pressure ph2 (T22 to T23). The trigger pressure ph1 is lower than the aforementioned high holding pressure ph0. The upper limit pressure ph2 is higher than the trigger pressure ph1 and lower than the high holding pressure ph0. The brake pressure changes so as to gradually decrease from the upper limit pressure ph2 to a predetermined low holding pressure ph3 (time T23 to T24).

The brake pressure is held at the low holding pressure ph3 or lower from time T24 onward. While the brake pressure remains held at the low holding pressure ph3 or lower, the brakes 32, 33 are maintained in a braking state.

Figure 8:
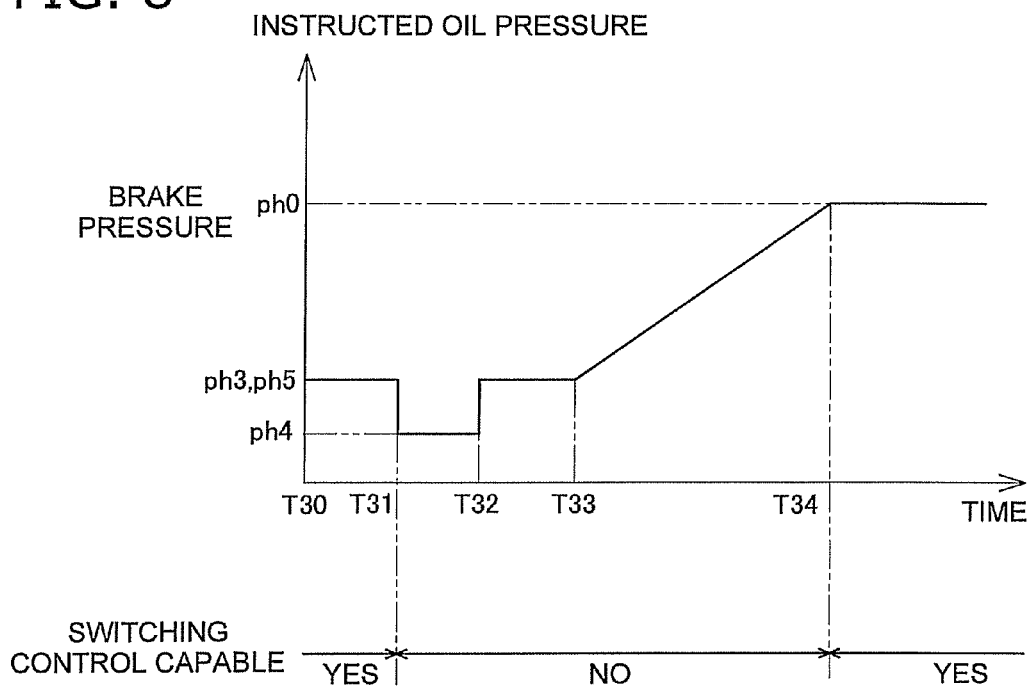
FIG. 8 is a timing chart showing an example of brake oil pressure control in the work machine according to the second embodiment.

Conversely, in cases in which the brakes 32, 33 are switched from a non-braking state to a braking state, the brake pressure is controlled in the manner of the timing chart shown in FIG. 8.

First, before switching is initiated (time T30), the brake pressure is maintained at a predetermined low holding pressure ph3 or lower. As described above, since the brakes 32, 33 are negative brakes, maintaining the brake pressure at the low holding pressure ph3 or lower causes the brakes 32, 33 to be maintained in a braking state.

When the operating unit 123 is then operated (time T31), the instructed oil pressure to the brakes 32, 33 is controlled so that the brake pressure changes with a predetermined waveform (time T31 to T34). Specifically, the brake pressure is held at an initial pressure ph4 (time T31 to T32) and a lower limit pressure ph5 (T32 to T33). The initial pressure ph4 is lower than the low holding pressure ph3. The lower limit pressure ph5 is higher than the initial pressure ph4 and equal to the aforementioned low holding pressure ph3. The brake pressure changes so as to gradually increase from the lower limit pressure ph5 to the predetermined high holding pressure ph0 (time T33 to T34).

The brake pressure is held at the high holding pressure ph0 from time T34 onward. While the brake pressure remains held at the high holding pressure ph0, the brakes 32, 33 are maintained in a non-braking state.

Switching Control for Directional Control Valve 122 in Hydraulic Device 30

In the hydraulic device 30 according to the present embodiment, switching control (switching operation) for the directional control valve 122 is performed in the same manner as in the first embodiment described above. Specifically, if the directional control valve 122 is connected to the second hydraulic oil line P2 in cases in which the hydraulic oil is at a predetermined low temperature or the engine rotational speed is a predetermined low speed, the connection of the directional control valve 122 is switched to the first hydraulic oil line P1 as a general principle. The engine rotational speed reaches the predetermined low speed when, e.g., the engine 4 starts up, when a switch is made between forward and reverse travel, or at other times. In cases in which the work machine 400 is provided with a deceleration function for reducing the engine rotational speed by operator commands, the engine rotational speed reaches the predetermined low speed also when the deceleration function is turned on.

The switching controller 121 does not instruct the directional control valve 122 to switch in cases in which any of the clutches of the multi-stage transmission 1 or steering device 3 are in a state transition or in cases in which any of the brakes 32, 33 of the steering device 3 are operating, even if the hydraulic oil temperature or engine rotational speed fulfills the above-described requirements.

The term "case in which the clutches are in a state transition" refers to a state in which the clutch pressure is changing with a predetermined waveform, i.e., a state in which clutch pressure modulation is being performed, as described above. Specifically, during the time period from time T1 to T6 in FIG. 5 or the time period from time T13 to T15 in FIG. 6, switching of the directional control valve 122 is inhibited (see FIG. 5(g) and FIG. 6(g)). In FIG. 6, switching of the directional control valve 122 is inhibited during a broader time period including the time period from time T13 to T15, i.e., during the time period from time T12 to T15.

The term "while the brakes 32, 33 are being operated" refers to a state in which the brake pressure is being controlled so as to change with a predetermined waveform, i.e., a state in which clutch pressure modulation is being performed. Specifically, switching of the directional control valve 122 is inhibited during the time period from time T21 to T24 in FIG. 7 and during the time period from time T31 to T34 in FIG. 8.

The description of the detailed process flow is the same as that of the first embodiment and is therefore omitted.

According to the present embodiment, the necessary oil amount and oil pressure can be provided in the multi-stage transmission 1 and the steering device 3 by adding the supply of hydraulic oil from the second pump 22, even in cases in which the hydraulic oil is insufficient with only the hydraulic oil supplied from the first pump 21. Therefore, the size of the first pump 21 can be established using for a reference the amount of oil discharged when the hydraulic oil is at a high temperature or when the engine 4 is rotating at a high speed. As a result, loss in the hydraulic device 30 can be reduced without compromising the response of the clutches or brakes 32, 33.

Furthermore, according to the present embodiment, switching of the connection of the second pump 22 by the directional control valve 122 is inhibited when the clutches are in a state transition and when the brakes 32, 33 are being operated. Therefore, the oil pressure of the clutches and brakes 32, 33 can be appropriately controlled. As a result, it is possible to avoid shocks during gear-shifting and sudden changes in the effectiveness of the brakes 32, 33.

Other Embodiments

The embodiments of the present invention described above are examples for describing the present invention, and are not intended to limit the range of the present invention to those embodiments alone. Those skilled in the art of the invention will be capable of carrying out the present invention in various other modes without deviating from the scope of the invention.

For example, the determination of whether or not the clutches are in transition or the brakes are being operated (step S21 in FIG. 2) may be made before the determinations of the hydraulic oil temperature and the engine rotational speed (steps S21, S13 in FIG. 2).

In the second embodiment described above, the work machine 400 comprises steering clutches 11, 12 and brakes 32, 33, but the present invention can also be applied to a work machine having no steering clutches, e.g., a work machine having an HSS (Hydrostatic Steering System). The present invention can also be applied to a work machine comprising brakes that are not used for turning but are used for braking the vehicle. The present invention can also be applied to a work machine having no multi-stage transmission, e.g., a work machine comprising an HST (hydrostatic transmission). Furthermore, the present invention may be applied merely to control of the multi-stage transmission in a work machine having no steering clutches 11, 12 or brakes 32, 33 as described above.

Figure 9:
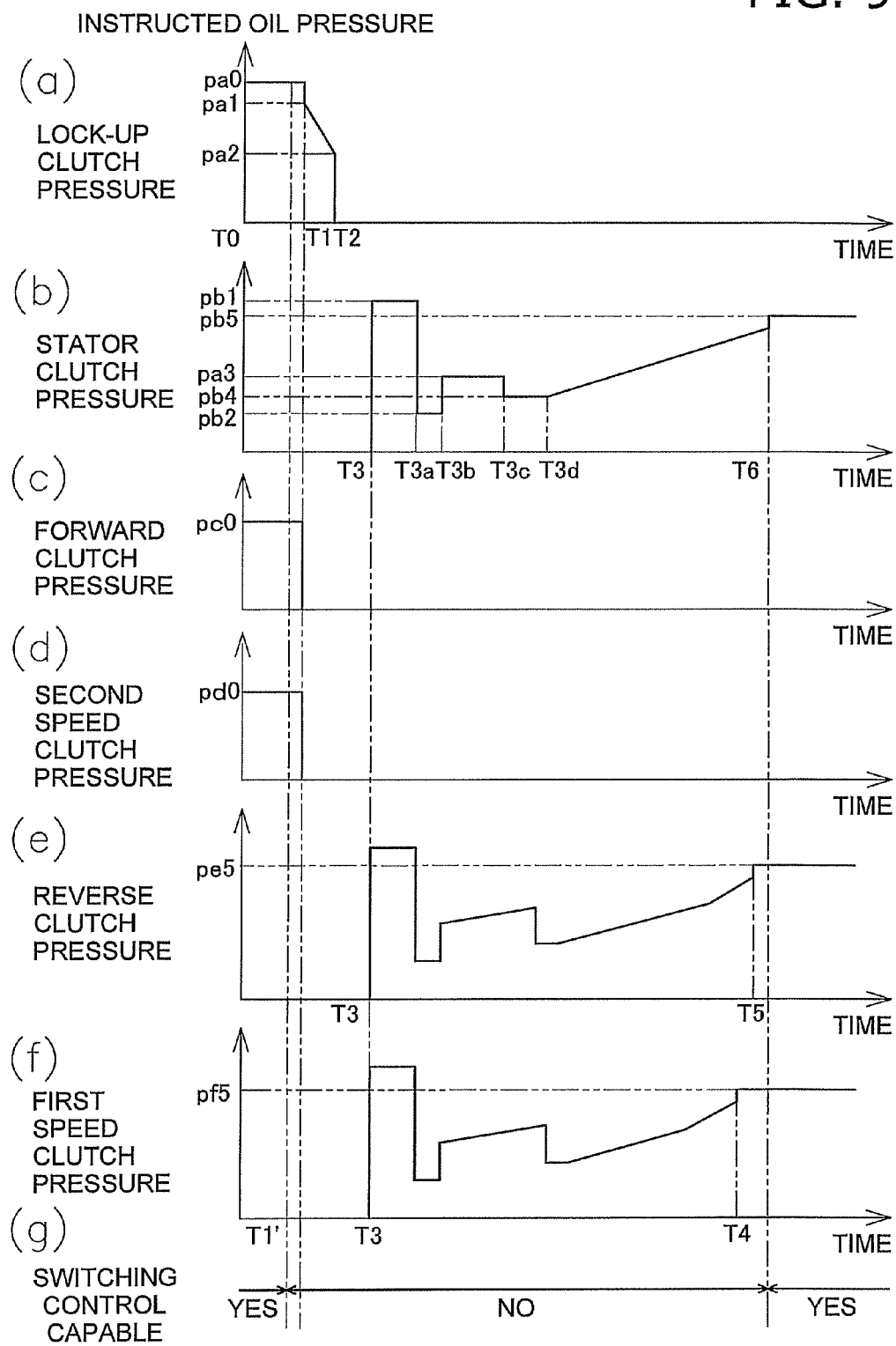
FIG. 9 is a timing chart showing an example of clutch oil pressure control according to another embodiment.
Figure 10:
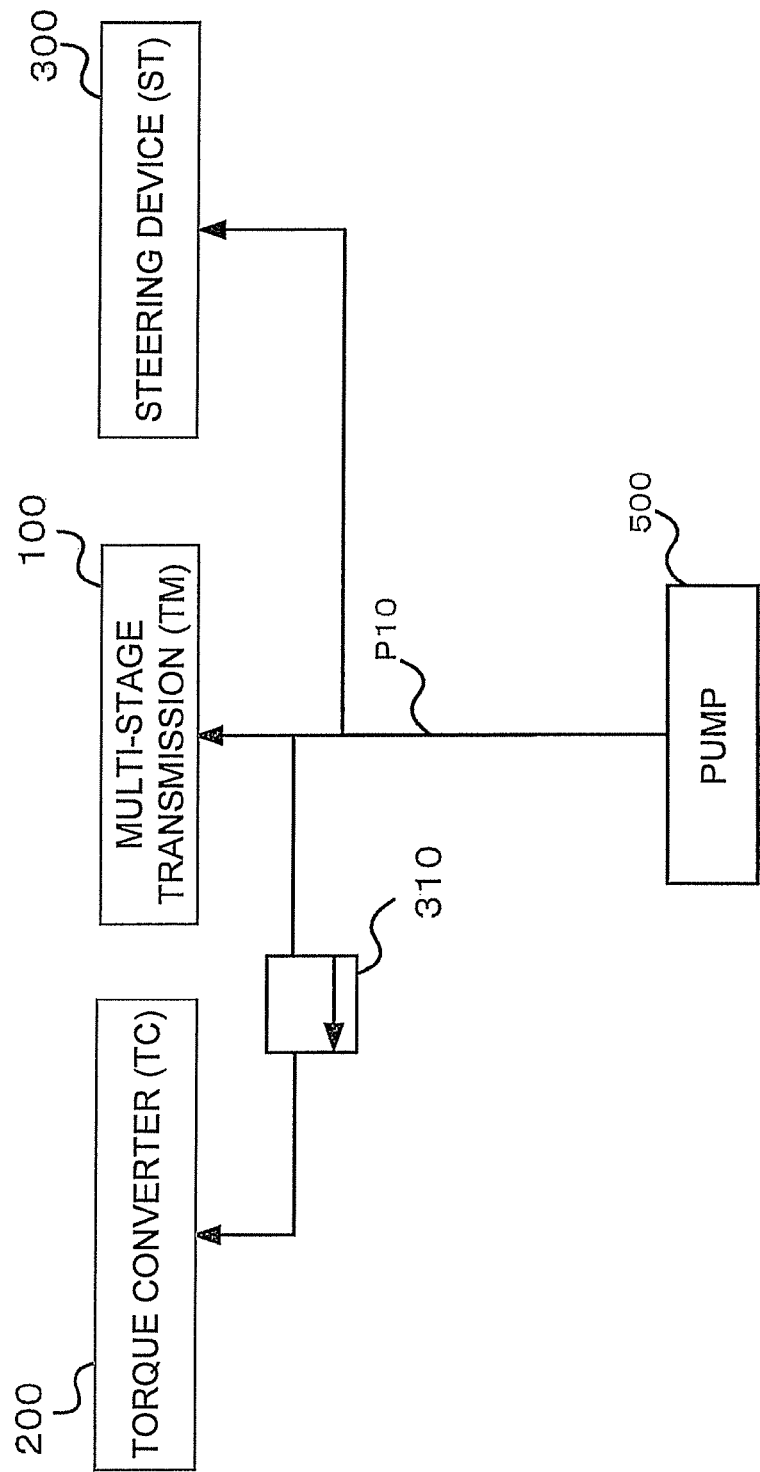
FIG. 10 is a structural diagram schematically depicting the functional configuration of a conventional hydraulic device.

In the second embodiment described above, switching of the directional control valve 122 is inhibited during the time period from the start to completion of clutch modulation, i.e., during the time period from time T1 to T6 as shown in FIG. 5. However, taking the clutch response delay time into account, switching of the directional control valve 122 may be inhibited during a broader time period including the time period from the start to completion of modulation. For example, switching of the directional control valve 122 may be inhibited during the time period from time T1' to T6, as shown in FIG. 9. The timing chart shown in FIG. 9 shows the same clutch oil pressure control as the timing chart shown in FIG. 5.

Furthermore, the connection of the second pump 22 may be switched by determining the timing of the operation of the multi-stage transmission 1 or the brakes 32, 33 on the basis of an operation signal from the operating unit 123, command signals to the torque converter control valve 41, the gearshift mechanism control valve 42 and the steering control valve 43, or the like. For example, in FIG. 6, a control may be performed so that the second pump 22 is connected to the first hydraulic oil line P1 via the directional control valve 122 when a gearshift command of the multi-stage transmission 1 is outputted (time T11). Switching of the directional control valve 122 is not inhibited from time T11 to time T12. Therefore, in cases in which the second pump 22 is connected to the second hydraulic oil line P2 at time T11, switching of the connection of the second pump 22 is performed, and the second pump 22 is connected to the first hydraulic oil line P1. Switching of the directional control valve 122 is inhibited during the time period from time T12 to T15.

The present invention enables oil pressure control to be appropriately performed during switching of a multi-stage transmission and a steering device, and the present invention is useful as a hydraulic device and a work machine.

The invention claimed is:
1. A hydraulic device for supplying hydraulic oil to a torque converter, a multi-stage transmission, and a steering device, the hydraulic device comprising:
a first pump configured and arranged to discharge hydraulic oil, the first pump being connected to the multi-stage transmission and the steering device via a first hydraulic oil line;
a second pump configured and arranged to discharge hydraulic oil, the second pump being connected either to the multi-stage transmission and the steering device via the first hydraulic oil line, or to the torque converter via a second hydraulic oil line;
a connection switching unit configured and arranged to selectively connect the second pump to either the first hydraulic oil line or the second hydraulic oil line on the basis of an inputted control signal;
an operating state detector configured and arranged to detect an operating state; and
a switching controller configured to control, based on the operating state detected by the operating state detector, a switching operation of the connection switching unit to selectively connect the second pump either to the first hydraulic oil line or to the second hydraulic oil line, the switching controller being further configured to inhibit the switching operation of the connection switching unit when the detected operating state is such that either at least one of clutches of the multi-stage transmission and the steering device is in a state transition, or at least one brake of the steering device is being operated.

2. The hydraulic device according to claim 1, wherein the switching controller is configured to control the connection switching unit so that the second pump is connected to the first hydraulic oil line in a case in which the operating state detected by the operating state detector is such that either an engine rotational speed is lower than a predetermined rotational speed or a hydraulic oil temperature is lower than a predetermined temperature, and a case in which none of the clutches of the multi-stage transmission and the steering device is in a state transition and no brake of the steering device is being operated.

3. A hydraulic device for supplying hydraulic oil to a torque converter and a multi-stage transmission having a plurality of gear-shifting clutches driven by oil pressure and switching speed levels by switching the gear-shifting clutches, the hydraulic device comprising:
a first hydraulic oil line connected to the gear-shifting clutches;
a first pump configured and arranged to discharge hydraulic oil, the first pump being connected to the gear-shifting clutches via the first hydraulic oil line;
a second hydraulic oil line connected to the torque converter;
a second pump configured and arranged to discharge hydraulic oil;
a connection switching unit configured and arranged to selectively connect the second pump to either the first hydraulic oil line or the second hydraulic oil line;
an operating state detector configured and arranged to detect an operating state; and
a switching controller configured to control, based on the operating state detected by the operating state detector, a switching operation of the connection switching unit to selectively connect the second pump either to the first hydraulic oil line or to the second hydraulic oil line, the switching controller being further configured to inhibit the switching operation of the connection switching unit when the detected operating state indicates that the gear-shifting clutch is in a state transition.

4. A work machine comprising the hydraulic device according to claim 1.

5. A hydraulic device for supplying hydraulic oil to a torque converter and to a brake driven by oil pressure, the hydraulic device comprising:

a first hydraulic oil line connected to the brake;

a first pump configured and arranged to discharge hydraulic oil, the first pump being connected to the brake via the first hydraulic oil line;

a second hydraulic oil line connected to the torque converter;

a second pump configured and arranged to discharge hydraulic oil;

a connection switching unit configured and arranged to selectively connect the second pump to either the first hydraulic oil line or the second hydraulic oil line;

an operating state detector configured and arranged to detect an operating state; and a switching controller configured to control, based on the operating state detected by the operating state detector, a switching operation of the connection switching unit to selectively connect the second pump either to the first hydraulic oil line or to the second hydraulic oil line, the switching controller being further configured to inhibit the switching operation of the connection switching unit when the detected operating state indicates that the brake is being operated.

* * * * *